Inventors
Ernest C. Kenney
John F. Moody
Joseph Robbins
By their Attorney
Robert E Ross

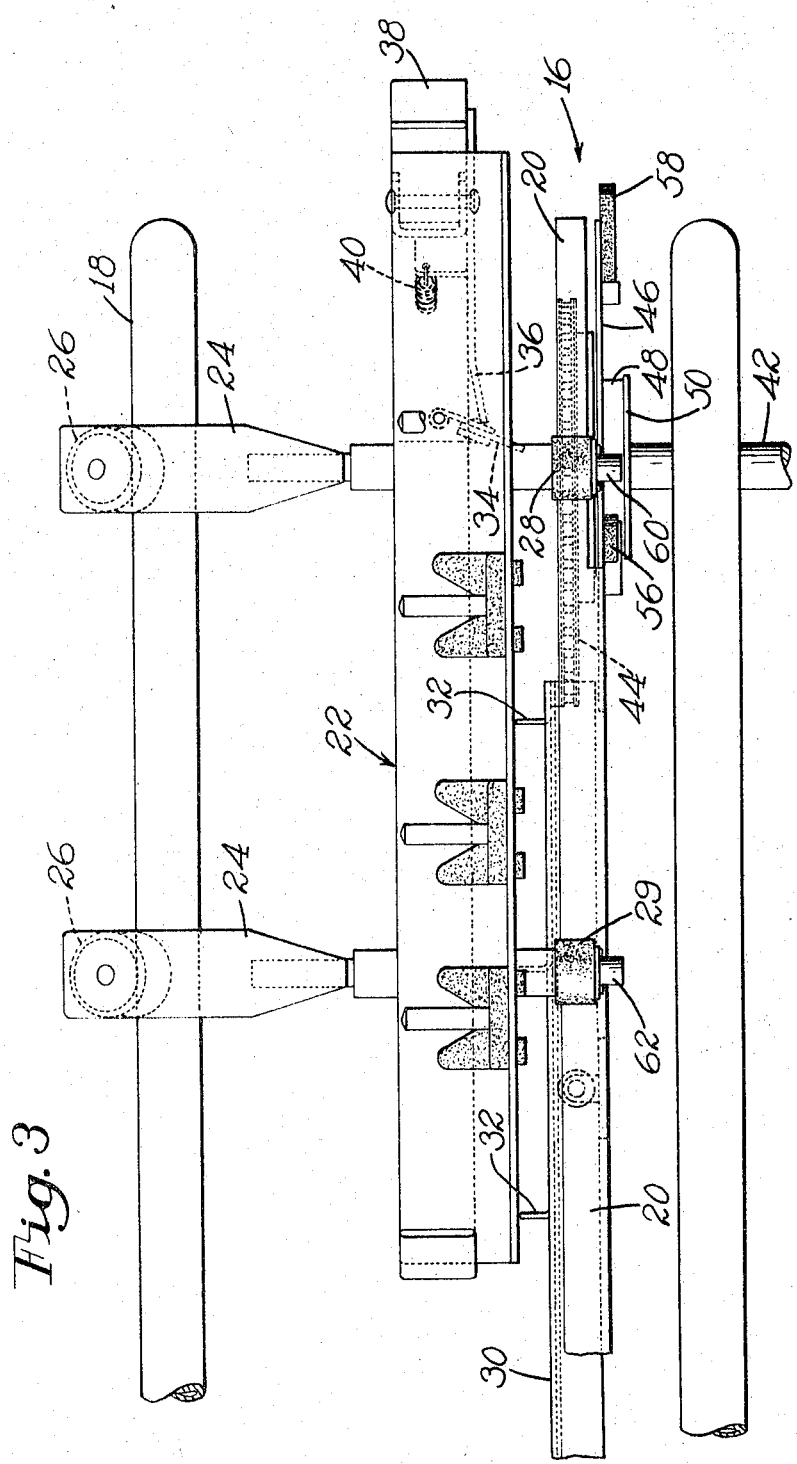

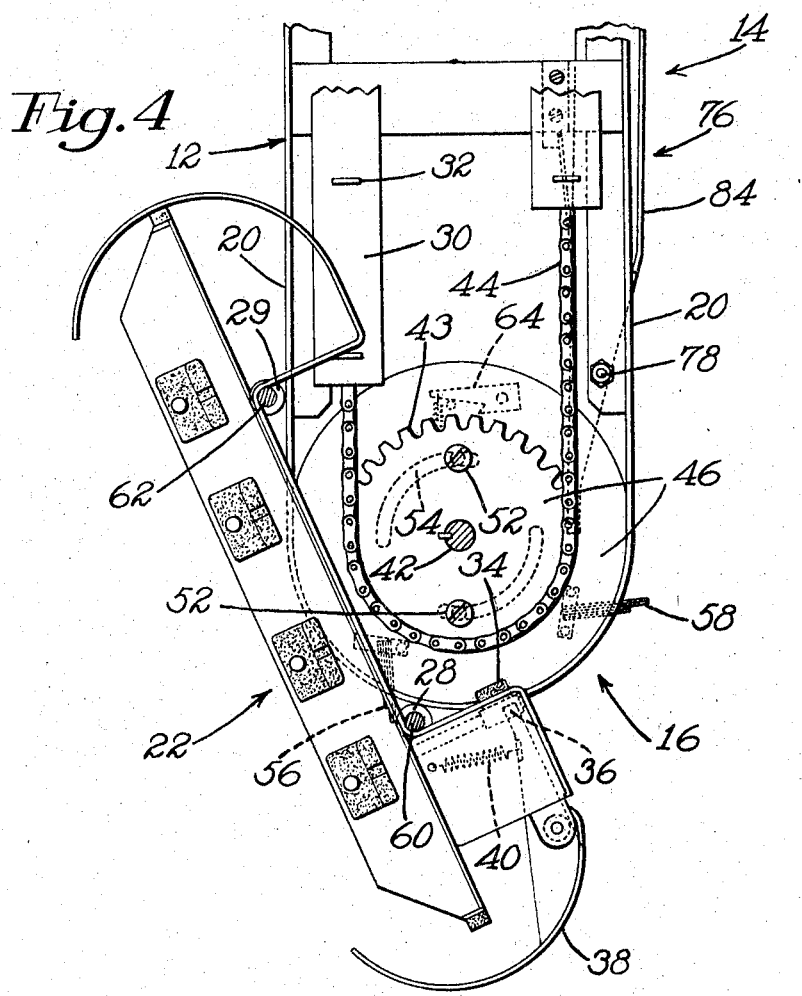
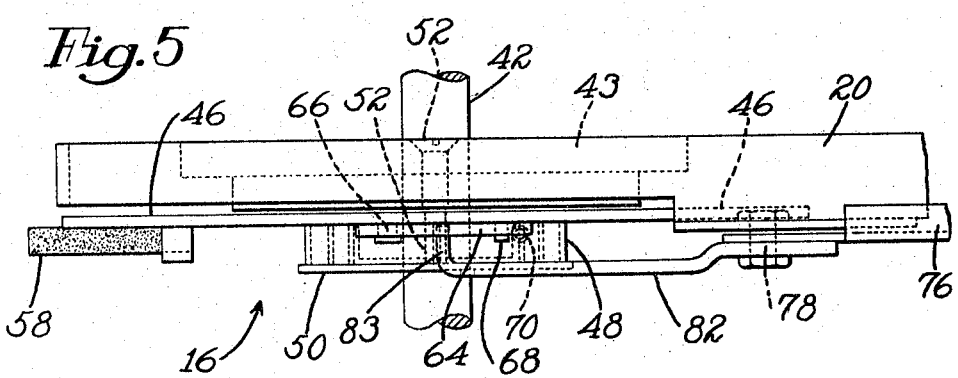

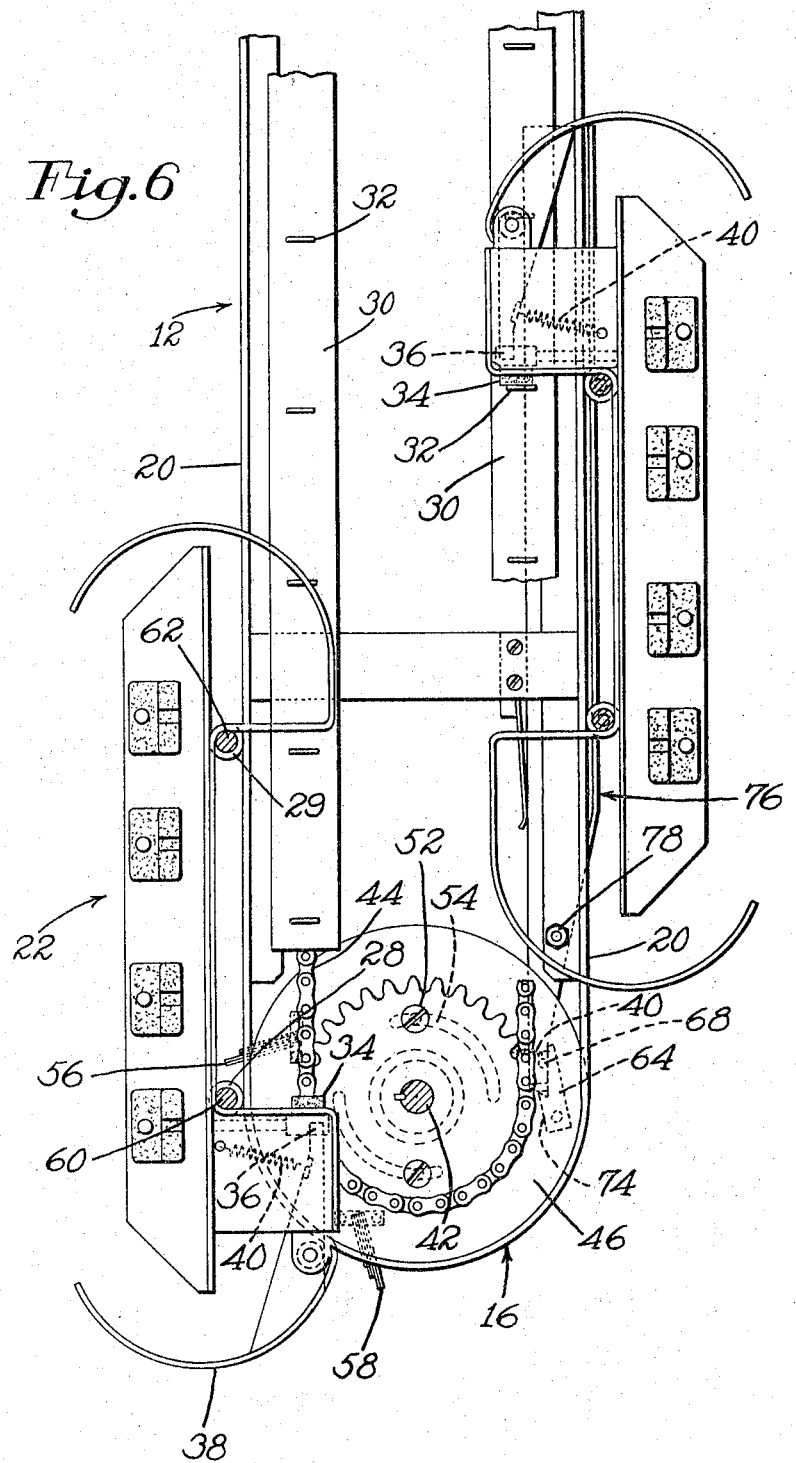

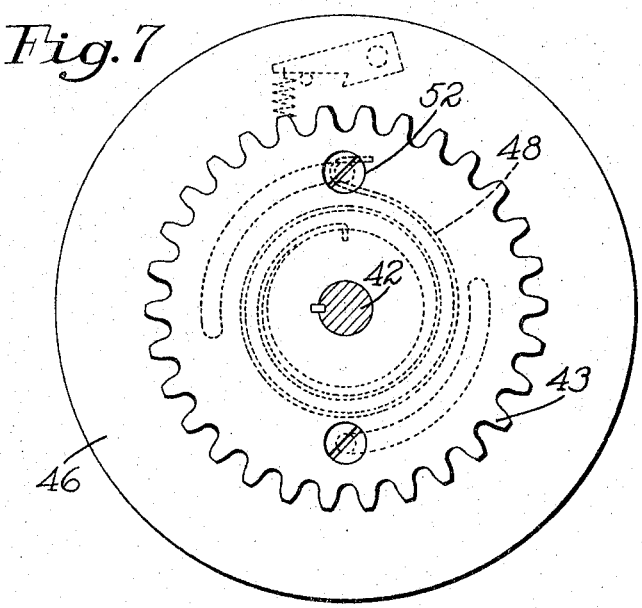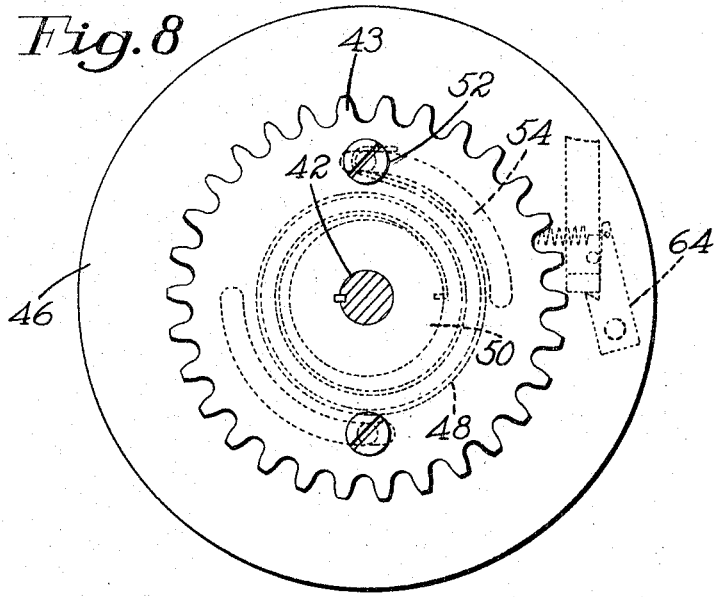

United States Patent Office 3,317,024
Patented May 2, 1967

3,317,024
CONVEYOR SYSTEMS
Ernest C. Kenney, John F. Moody, and Joseph Robbins, Leicester, England, assignors to United Shoe Machinery Corporation, Flemington, N.J., a corporation of New Jersey
Filed July 10, 1964, Ser. No. 381,640
Claims priority, application Great Britain, July 11, 1963, 27,458/63
4 Claims. (Cl. 198—24)

This invention relates generally to conveyors and has particular reference to a conveyor in which means is provided for controlling the movement of article carriers between separate runs of the conveyor system.

In a copending application Ser. No. 354,247, filed Mar. 24, 1964, now Patent No. 3,255,710, there is disclosed a conveyor system comprising a plurality of tiered support rails on which roller-mounted article carriers are moved between work stations by an oscillating drive bar. Each tier is formed as a double-run conveyor comprising parallel outgoing and incoming runs spaced apart an appropriate distance with means disposed at at least one end for receiving an article carrier from the outgoing run and transferring it around the end of the carrier to the incoming run. The individual article carriers are each provided with drive bar engaging means and bumper means on the forward end which on contact with a previous article carrier actuates means for rendering the drive bar engaging means inoperative. When an article carrier is conveyed around the end of the conveyor, if a previous article carrier is stopped at the discharge side of the transfer mechanism, the article carrier in the transfer mechanism could possibly contact the previous carrier at an angle such that the bumper mechanism would not be operated. Damage to the drive mechanism or to the carrier could result.

An object of this invention is to provide a conveyor system of the type described in which means is provided for preventing the entrance of an article carrier into the transfer mechanism if another article carrier is in a predetermined position on the exit side of the transfer mechanism.

A further object of the invention is to provide a transfer mechanism for use in a conveyor system of the type described in which means is provided for rendering the transfer mechanism inoperative if an article carrier is present at the exit of the transfer mechanism.

A further object of the invention is to provide a transfer mechanism for use in a conveyor system of the type described in which the transfer means is driven by resilient means which prevents excessive force from being applied to an article carrier. Other objects of the invention will be apparent to one skilled in the art from the following detailed description of a specific embodiment thereof.

In the drawing:

FIG. 3 is a view of the upper portion of the mechanism of FIG. 1 as seen from the left side;

FIG. 4 is a view similar to FIG. 1 in which an article carrier has entered the transfer mechanism;

FIG. 5 is a view of the transfer mechanism of FIG. 4 as seen from the right side;

FIG. 6 is a view similar to FIG. 4 in which the article carrier has arrived at the exit side of the transfer mechanism and has rendered the transfer mechanism inoperative;

FIG. 7 is a view in section taken on line VII—VII of FIG. 3; and

FIG. 8 is a view similar to FIG. 7 illustrating the transfer device in the locked condition.

Figure 1:
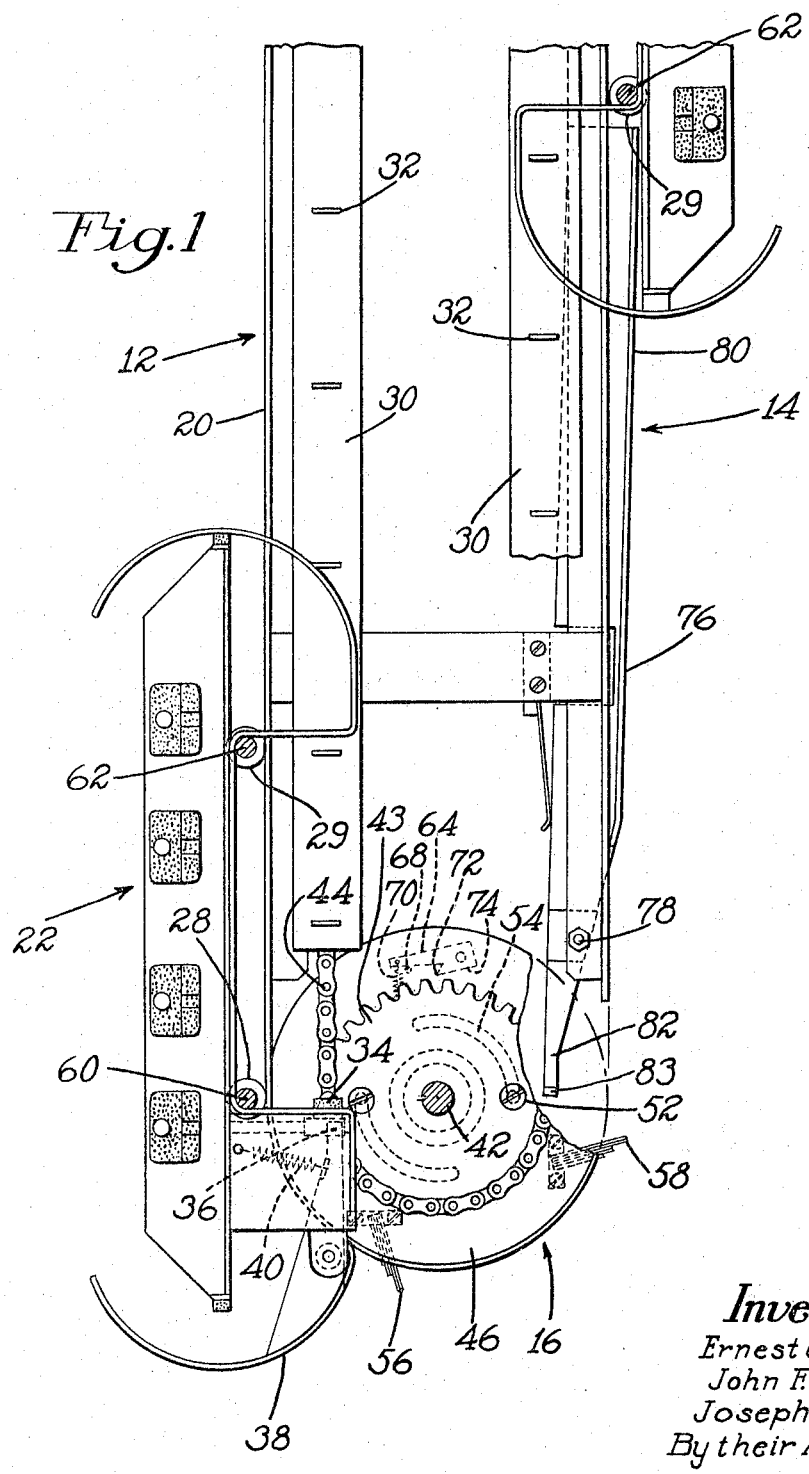
FIG. 1 is a top plan view of a portion of a conveyor system embodying the invention, with the transfer mechanism in the operative condition and an article carrier positioned to enter the transfer mechanism.
Figure 2:
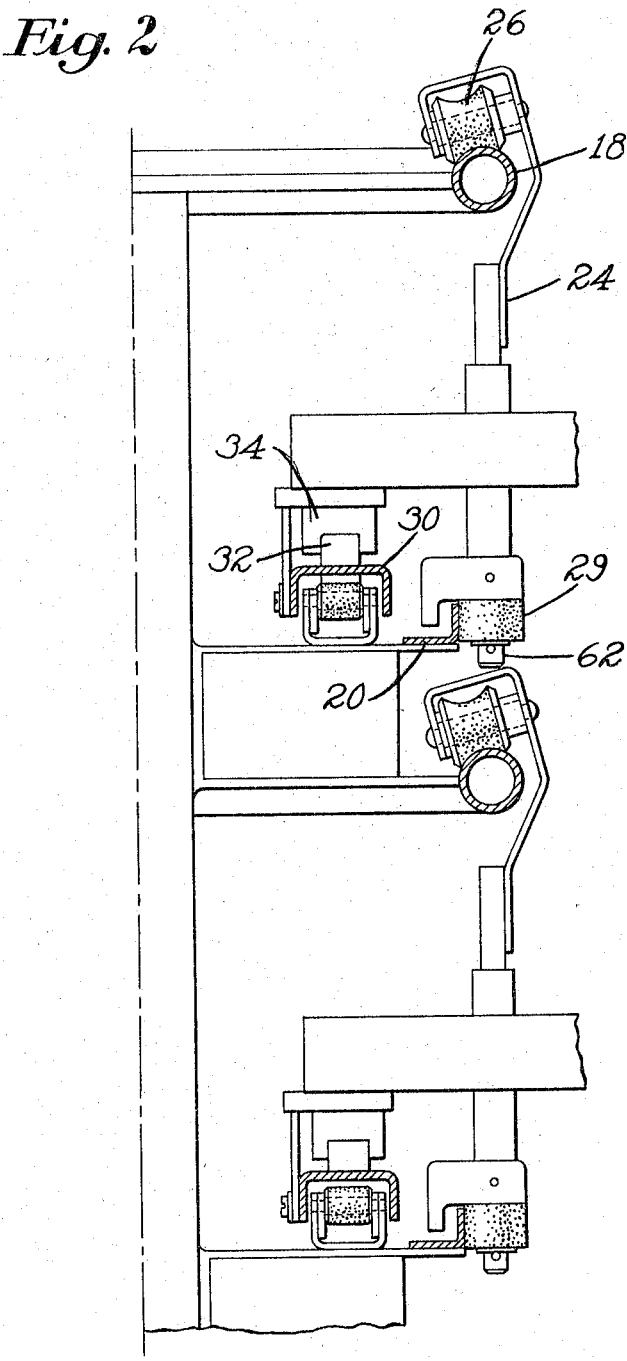
FIG. 2 is a view in section taken on line II—II of FIG. 1.

Referring to the drawings there is illustrated a conveyor system 10 comprising a pair of spaced runs 12 and 14 having a transfer mechanism 16 disposed at one end of the runs. The runs 12 and 14 each comprise upper and lower support rails 18 and 20 adapted to support and guide an article carrier 22. In the illustrated embodiment the carrier 22 is provided with a pair of hangers 24 having rollers 26 for riding on the upper rail and a pair of lower rollers 28 and 29 for resting against the outer side of the lower rail. The carrier 22 is readily removed from the conveyor by simply lifting it clear of the rails.

To provide means for driving the article carrier along the conveyor each run is provided with a drive bar 30 which is disposed on the lower support rail and is adapted to oscillate back and forth through a predetermined distance, driven by means to be described hereafter. Upstanding drive lugs 32 are provided on the drive bar to cooperate with a drive dog 34 on the article carrier. The drive dog 34 is horizontally pivoted as shown in FIGS. 3 and 6 so that on rearward movement of the drive bar a drive lug can pass the drive dog by causing rearward pivoting thereof. A movable stop 36 is disposed forwardly of the drive dog which normally prevents forward pivoting thereof. Therefore, on said forward movement of the drive bar 30 the contact of a drive lug 32 with the drive dog 34 will move the article carrier 22 forwardly. To provide means for rendering the drive system of a particular carrier inoperative when it collides with a preceding carrier, a bumper 38 is provided at the front of the article carrier, said bumper being horizontally pivoted at one end, and being biased to a forward position by a spring 40. The stop 36 is connected to the bumper by suitable linkage so that rearward movement of the bumper 38 (such as occurs when the carrier is moved by the drive lugs against a preceding stationary carrier) causes the stop 36 to move away from its normal position in front of the drive member 34. Thereafter forward movement of a drive lug against the drive member merely causes the drive member to pivot forwardly and no forward movement of the article carrier results. When the preceding carrier moves away the spring 40 returns the bumper to its original position, thereby moving the abutment back into the drive position ahead of the drive member.

When the article carriers are moving around the end of the conveyor from the end of the first run 12 to the beginning of the second run 14 adjacent article carriers are disposed at such an angle to each other that on collision therebetween the bumper of the following carrier would not be actuated. For this reason the transfer means now to be described is provided with means rendering it inoperative when a carrier is in a predetermined position on the exit side thereof at the beginning of the second run.

The transfer mechanism comprises generally a vertical drive shaft 42 which is adapted to oscillate through a predetermined angle of rotation driven by any convenient crank means (not shown). Fixed on said shaft is a drive sprocket 43 which drives a chain 44 connected to the drive bars 30 of the conveyor runs and rotatably mounted on said shaft is a drive disk 46. To provide a resilient coupling between the drive sprocket 43 and the disk 46 a spiral spring 48 (FIG. 8) is disposed around a collar 50 secured to the disk. The inner end of the spring is attached to the collar 50 and the outer end of the spring is attached to the drive sprocket by means of a stud 52 projecting from the plate through a curved slot 54 in the drive disk. The spring 48 is pretensioned so that the drive disk is biased in a counterclockwise direction (as seen in FIG. 1) so that the rear end of the curved slot 54 rests against the stud 52.

As the drive shaft oscillates, the drive sprocket drives teh disk 46 through the spring 48, so that said disk 46, when not under appreciable load, oscillates through approximately the same angle as the shaft 42. Projecting outwardly from the periphery of the drive disk 46 is a pair of flexible drive tabs 56 and 58 which are circumferentially spaced at predetermined positions as will appear hereinafter.

The carriers 22 are moved to the entrance side of the transfer device by the drive lugs 32 to a position such that when the drive disk oscillates to its furthest rearward or clockwise position (as seen from the top) the rear flexible drive tab 56 snaps past a pin 60 projecting downwardly from the front roller 28. On subsequent forward motion of the drive disk the carrier is moved part way around the end of the conveyor to the position shown in FIG. 4. The flexible drive tabs are spaced circumferentially a distance slightly less than the length of the arc through which the drive disk oscillates, so that on the next rearward portion of the cycle of oscillation, the front drive tab 58 is able to snap past the pin 60, so that said front drive tab moves the carrier further around the transfer mechanism on the next forward portion of the cycle. A second pin 62 projects downwardly from the rear roller 29, said pins 60 and 62 being spaced apart a distance such that on the next rearward portion of the cycle of oscillation the rear flexible drive member 56 snaps behind the pin 62 to move the carrier a further distance around the end of the conveyor on the subsequent forward portion of the cycle. On the next rearward portion of the cycle the front flexible drive member 56 catches the rear pin 62 and moves the carrier far enough onto the incoming run for the drive dog 34 of the carrier to be engaged by a drive lug on the drive bar of the second run.

To prevent a second carrier from entering the transfer mechanism in the event that a carrier is stopped near the beginning of a second run in a position such that a following carrier would strike at an undesirable angle means now to be described is provided for stopping the oscillation of the drive disk under such conditions. Disposed on the lower surface of the drive disk is a latch arm 64 which is pivoted on a stud 66 mounted on the drive disk. The arm 64 extends generally in a counterclockwise direction and is biased against a pin 68 by a spring 70. The inner edge of the arm is provided with an abutment 72 and a cam surface 74 leading thereto. Disposed on the lower support rail 20 at the beginning of the second run of the conveyor (at the discharge side of the transfer mechanism) is a lever 76 which is medially pivoted at 78. An end portion 80 of the lever extends down stream of the outgoing run 14 and the other end 82 extends under the drive disk, with an upstanding end portion 83 disposed in cooperating relation with the latch arm 64. The end 80 of the lever extends along the rail 20 for a predetermined distance and has a portion 84 spaced outwardly from the rail into the path of the pins 60 and 62 of a carrier. Hence when a carrier arrives at the beginning of the second run (see FIG. 6) the end 80 of the lever is moved inwardly by the pins 60 and 62, thereby moving the opposite end 82 outwardly into the path of the abutment 72 on the latch arm 64. The latch arm 64 and the end 82 of the lever 76 are positioned in relation to each other so that, as the drive disk 46 reaches the clockwise end of its cycle oscillation, cam surface 74 of the latch lever cams past the end 82 of the lever 76 and snaps back into a latched position. Thereafter the drive disk is restrained against forward or counterclockwise movement by the end 82 of the lever 76 being disposed in front of the abutment 72.

After the drive disk has been latched in the manner described the continued oscillation of the plate 44 merely serves to wind and unwind the spring 48 around the collar 50 with no driving movement of the drive disk resulting (see FIGS. 6 and 8). When the carrier disposed over the lever 76 moves on down stream on the outgoing run 14 the lever pivots back to its original position so that the end 82 thereof moves away from in front of the abutment 72. Driving motion of the drive disk then resumes to move the next carrier around the transfer mechanism into engagement with the second run in the manner previously described.

Since certain obvious changes may be made in the illustrated embodiment of the invention without departing from the scope thereof it is intended that all matter contained herein be interpreted in an illustrative and not a limiting sense.

We claim:
1. In a conveyor system comprising conveyor means having two conveyor runs, each run having a support rail, transfer means disposed between adjacent ends of the runs for receiving articles, one at a time, from the end of one run and transferring them to the beginning of the other run, continually oscillating drive means for driving said transfer means, and means responsive to the presence of a single carrier at the beginning of the second run for stopping the transfer means without impeding the movement of said drive means.

2. In a conveyor system, comprising conveyor runs lying in the same horizontal plane, each having a support rail, a transfer means separate from the conveyor runs disposed at adjacent ends of the runs for transferring article carrying devices from the end of one run to the beginning of another, said transfer means comprising an oscillating drive member, a transfer member, and spring means connecting the drive member to the transfer member, whereby said transfer member normally oscillates with the drive member, and the oscillation of the transfer member may be stopped without stopping the oscillation of said drive member.

3. In a conveyor system, having conveyor runs each having an article-carrier support rail and drive means associated therewith, transfer means disposed between the runs for transferring an article carrying device from the end of one run to the beginning of the other run, an oscillating drive shaft, means connecting the drive shaft to the support rail drive means to cause reciprocation thereof, resilient means connecting the drive shaft to the transfer means to cause oscillation thereof, and means responsive to the presence of an article carrier at the beginning of the second run to stop the oscillation of said transfer means without stopping the reciprocation of said drive means.

4. In a conveyor system, having conveyor runs, each having a support rail, transfer means disposed at adjacent ends of the runs for transferring article carrying devices from the end of one run to the beginning of another, drive means associated with the runs for moving the article carriers along the rails toward and away from the transfer mechanism, an oscillatory drive shaft, means connecting the drive shaft to the drive means to cause reciprocation thereof, resilient means connecting the drive shaft to the transfer means to cause oscillation thereof, and means responsive to the presence of an article carrier at the beginning of the second run to stop the oscillation of the transfer means.

(References on following page)

References Cited by the Examiner

UNITED STATES PATENTS

| | | | |
|---|---|---|---|
| 1,787,993 | 1/1931 | Meyer | 198—24 X |
| 2,609,916 | 9/1952 | Kendall | 198—221 X |
| 2,801,725 | 8/1957 | Sindzinski et al. | 198—19 |
| 2,933,212 | 4/1960 | Hauck | 214—89 |
| 2,990,071 | 6/1961 | Davis et al. | 198—19 X |
| 3,160,259 | 12/1964 | Dalton | 198—24 X |
| 3,250,369 | 5/1966 | Pianowski et al. | 198—221 X |

EVON C. BLUNK, *Primary Examiner.*

R. J. HICKEY, *Assistant Examiner.*